Oct. 15, 1968     H. J. KINCH     3,406,282
HEADLAMP ADAPTER KIT FOR MOTOR VEHICLE
Filed Sept. 6, 1967
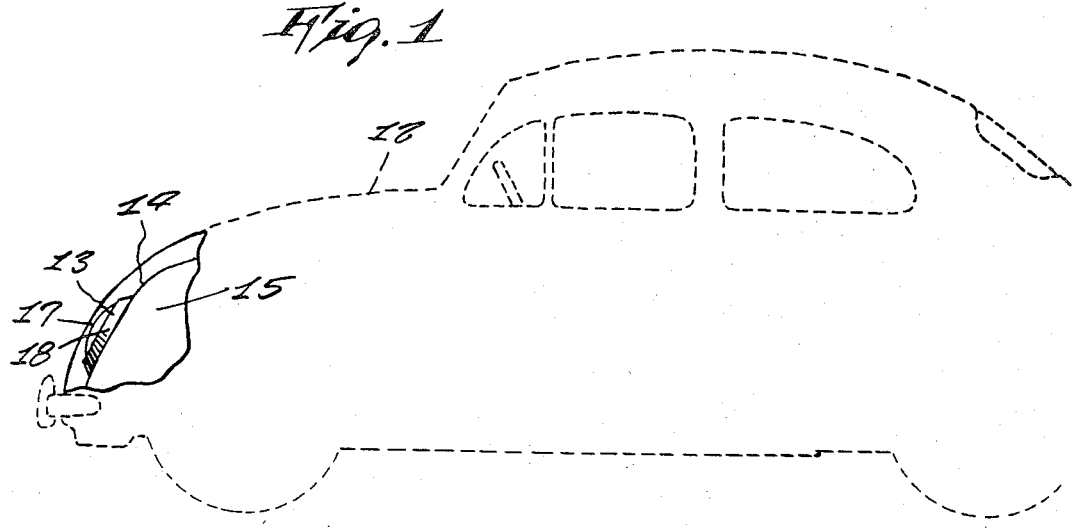
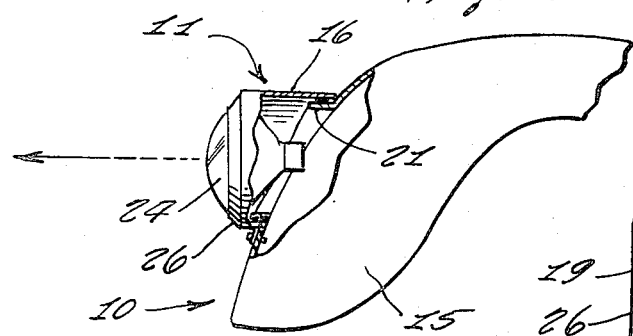
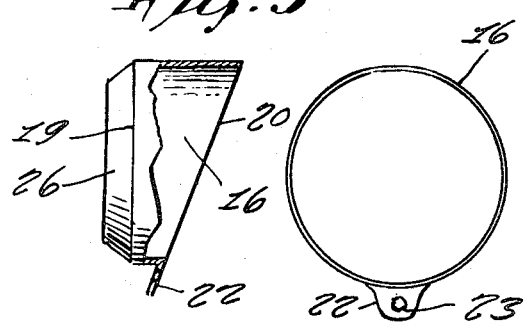
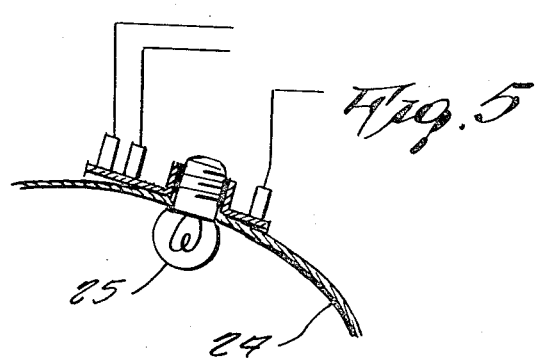
INVENTOR
HARVEY J. KINCH United States Patent Office 3,406,282
Patented Oct. 15, 1968

3,406,282
HEADLAMP ADAPTER KIT FOR MOTOR VEHICLE
Harvey J. Kinch, Rte. 1, Box 70,
Berthoud, Colo. 80513
Filed Sept. 6, 1967, Ser. No. 665,779
1 Claim. (Cl. 240—7.1)

ABSTRACT OF THE DISCLOSURE

An adapter unit usable with the headlamp of an automobile. The adapter is formed to accommodate a sealed beam lamp, reflector and electric wiring. A cylindrical shaped member positions the beam forward from the fender. The cylindrical member has an inclined edge which fits over a lip portion integral with the fender. The inclined edge is provided with a lug having an opening for receiving a mounting screw. The other edge of the cylinder member is bounded with a chrome plated rim.

This invention relates generally to Volkswagen automobiles. More specifically it relates to a headlamp for a Volkswagen automobile.

A principal object of the present invention is to provide an adapter for a Volkswagen headlamp so as to permit the sealed beam lamp to be mounted so that it is out front of the fender and not behind the glass shield.

Another object of the present invention is to provide a headlamp adapter that can be easily installed upon any Volkswagen car.

Other objects of the present invention are to provide an adapter kit which is simple in design, inexpensive to manufacture, rugged in construction, easy to use and efficient in operation.

These and other objects will be readily evident upon a study of the following specification and the accompanying drawing wherein:

FIGURE 1 is a side elevation view of a Volkswagen automobile and showing in particular the glass shield and metal holder which covers the sealed beam headlamp. This type shield and holder were used on the Volkswagen up to the 1967 model.

FIGURE 2 is an enlarged fragmentary side elevation view shown partly in cross-section and showing the present invention incorporated therein;

FIGURE 3 is an enlarged side elevation view partly in cross-section of the adapter kit;

FIGURE 4 is a rear elevation view thereof; and

FIGURE 5 is a fragmentary, enlarged cross-sectional view showing a lamp bulb mounted.

Referring now to the drawing in detail, the reference numeral 10 represents a Volkswagen automobile, according to the present invention, wherein adapter kit 11 has been installed.

As shown in FIGURE 1 of the drawing, the Volkswagen automobile 12 is conventionally manufactured having a headlamp glass shield 13 in an inclined position so as to conform to the contour 14 of a Volkswagen fender within which the lamp is mounted is designated with the reference number 15.

In the present invention there is a metal adapter 16 which is made to fit all models of Volkswagen automobiles that use the glass cover 17 and bezel 18 over the headlamp unit. The adapter 16 comprises a cylindrical member formed of sheet metal and which has opposite end edges 19 and 20, the latter being at an incline to conform to the fender contour. This end of the adapter is provided to fit over the lip 21 which is an integral part of the car and fashioned to utilize the bolt hole for the glass cover. Accordingly the adapter 16 is provided with a lug 22 at its lower end having a central opening 23 therethrough for receiving a screw. The adapter is so proportioned that displaces the sealed beam unit in proper alignment perpendicular to the car, perpendicular to the ground and parallel to the other headlamp with minor adjustment at the unit.

The adapter is designed to receive a headlamp assembly 24 such as is used on certain other makes of automobiles such as a Ford or other make. In order to adapt the headlamp assembly of another make of automobile a six volt sealed beam unit may be purchased or taken from the Volkswagen and inserted into the Ford headlamp assembly 24. This assembly is then fastened into the adapter 16. In FIGURE 5 of the drawing, the headlamp assembly 24 of a Ford is shown to include the parking lamp unit 25 which is also 6 volt. Into the shell of the Ford headlamp assembly 24 there is drilled a one-half inch opening to receive the electrical wires of the sealed beam lamp. The opening in the Ford headlamp assembly where the wires originally came through the shell is used for the parking lamp. A small opening for a sheet metal screw is drilled alongside this opening so as to hold the small parking light fixture as taken from the Volkswagen assembly. The inside of the Ford headlamp assembly shell is painted with aluminum paint so as to help reflect the parking light. The chrome plated rim 26 may be added to the adapter.

Thus there has been shown an adapter which serves two purposes. It eliminates the glass shield which covers the sealed beam unit. This glass cover can easily freeze over in freezing rain and snow which will block off a good portion of the light intended to be passed therethrough. The adapter brings the seal beam unit forwardly and exposes it, the heat of the seal beam unit melting any ice and thus keeping the headlamp clear at all times. Secondly the adapter, by eliminating the glass cover and by bringing the lamp forwardly, allows all the light to fall on the road, which makes for better road visibility.

While various changes may be made in the detailed construction, it is understood that such changes will be within the spirit and scope of the present invention as is defined by the appended claim.

I claim:

1. In a headlamp adapter kit for automobiles, the combination of an adapter, said adapter comprising a generally cylindrical member formed of sheet metal, said cylindrical member having a cylindrical side wall, said cylindrical side wall being bounded at one end by an edge that is perpendicular to the plane of said cylindrical side wall, and at its opposite end by an edge which is inclined respective to an axis of said cylindrical side wall, the latter said edge engaging a fender of an automobile having said fender with an upwardly, rearwardly inclined surface so that said axis of said cylinder extends horizontally, said adapter being fitted over a lip that forms an integral part of said fender, said adapter being provided to accommodate a headlamp assembly, said adapter having a downwardly extending lug along said inclined edge, said lug having an opening therethrough for receiving a mounting screw.

References Cited

UNITED STATES PATENTS

| | | | |
|---|---|---|---|
| 2,157,361 | 5/1939 | Urge | 240—7.1 |
| 2,219,143 | 10/1940 | Wharam | 240—8.1 |
| 2,784,303 | 3/1957 | Heiser | 240—7.1 |

NORTON ANSHER, *Primary Examiner.*

C. E. SMITH, *Assistant Examiner.*